Patented July 12, 1927.

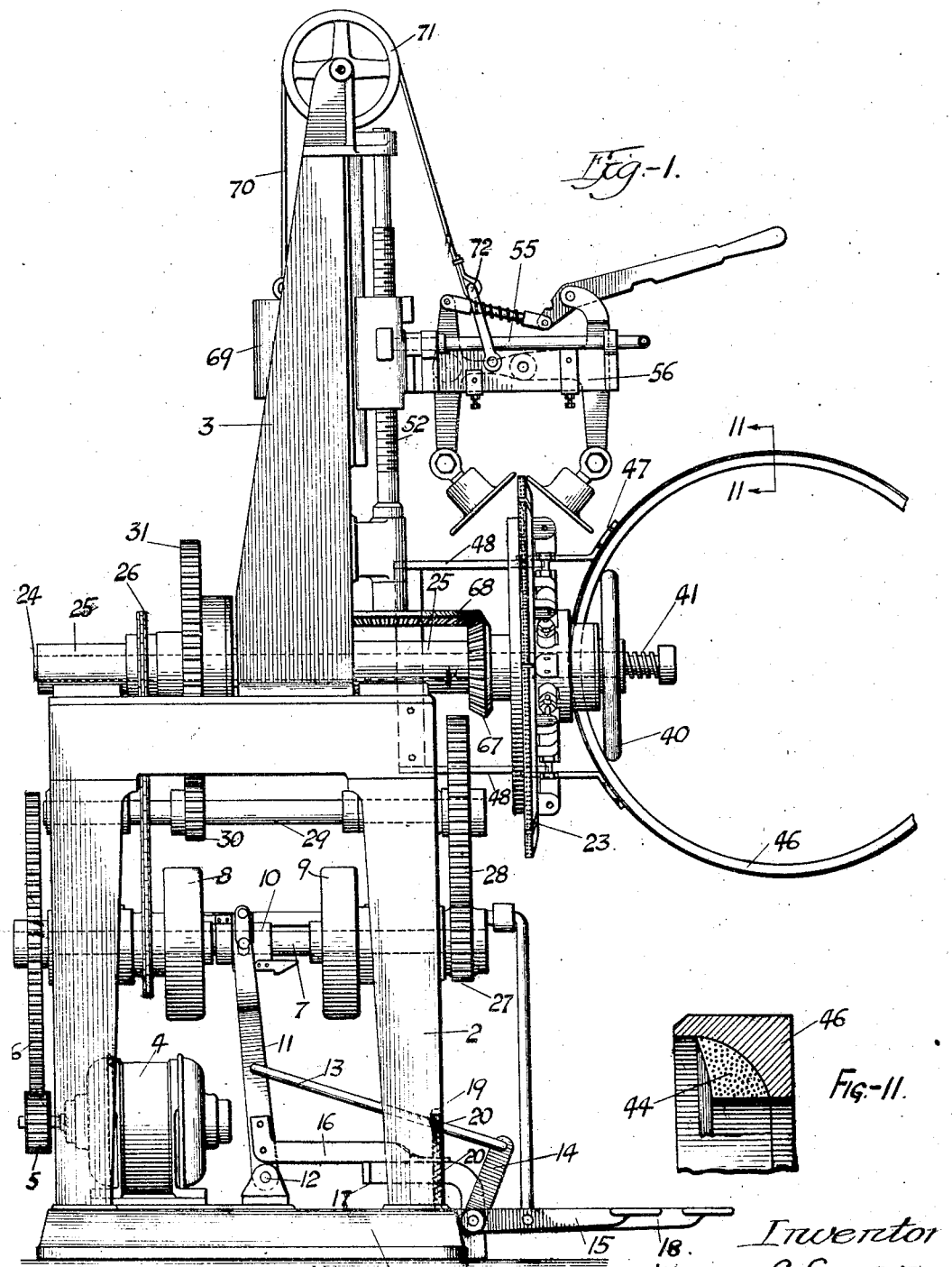

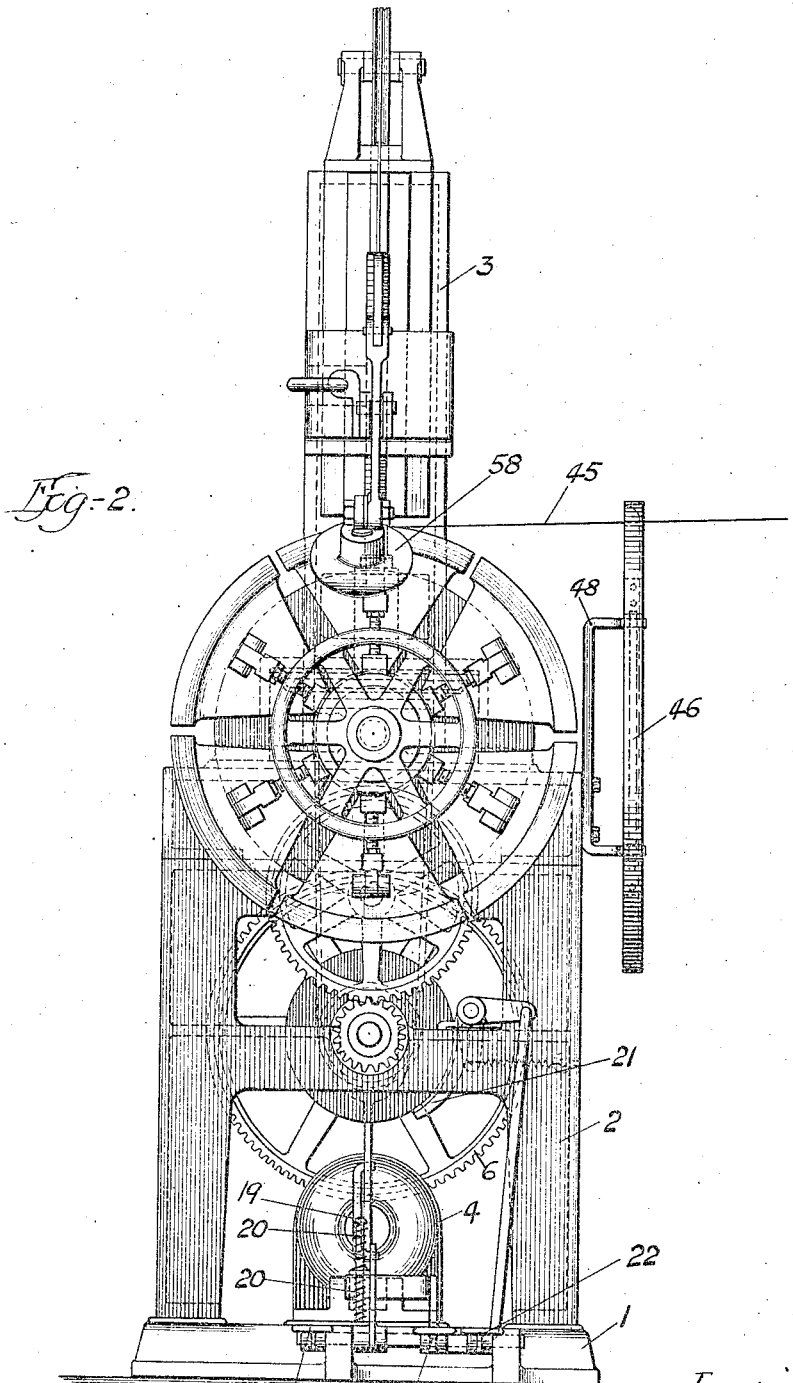

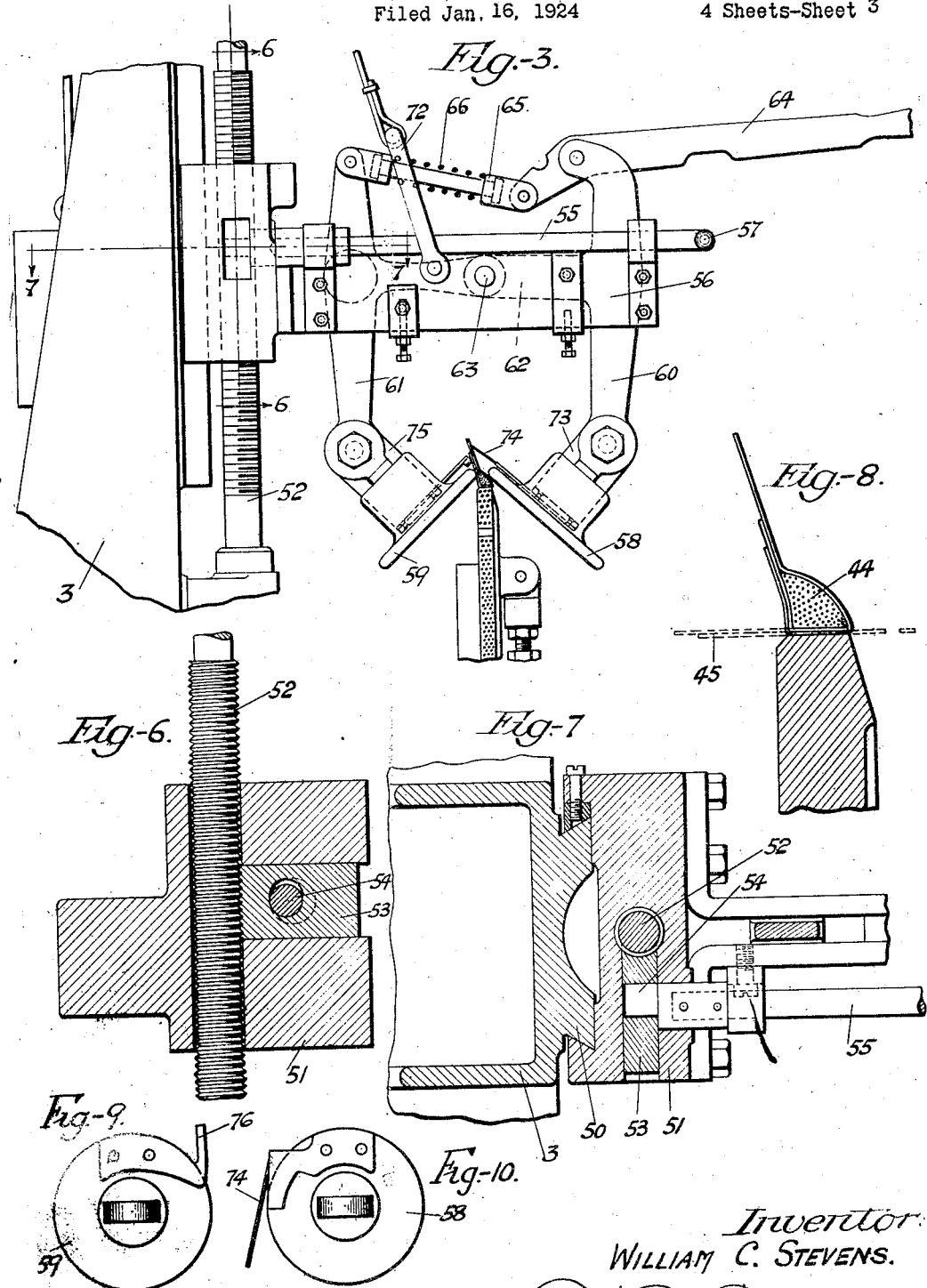

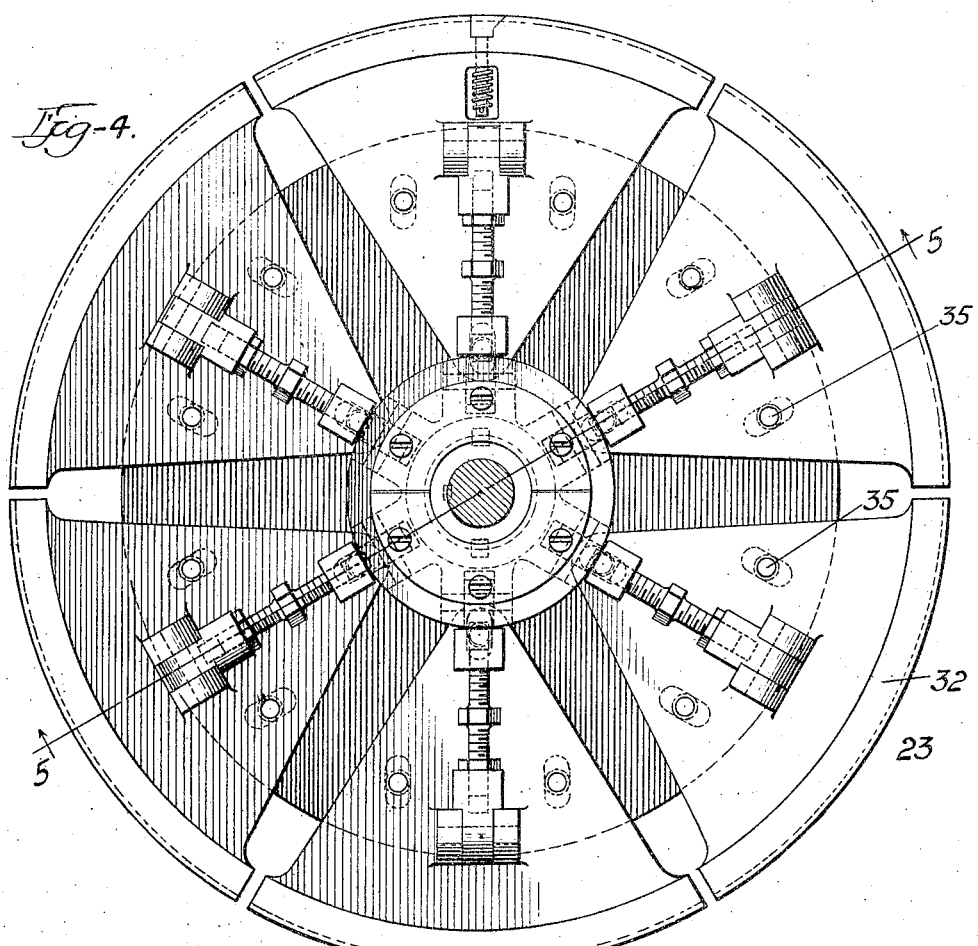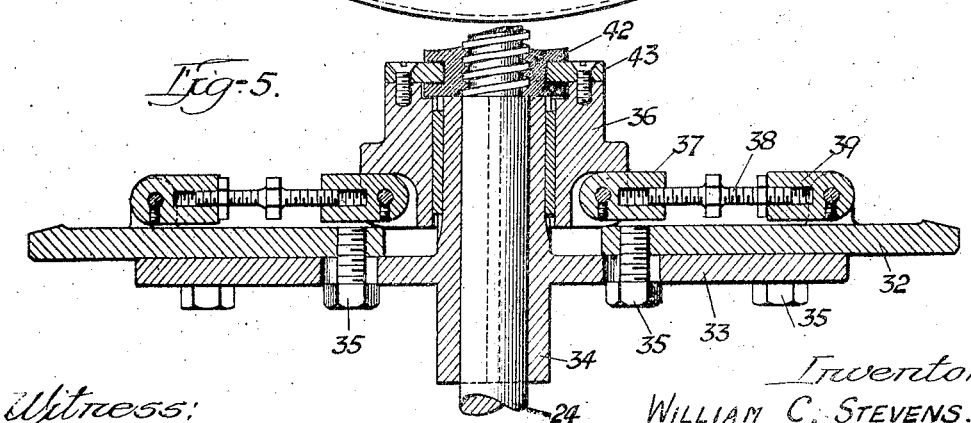

1,635,647

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

MACHINE FOR COVERING TIRE BEADS.

Application filed January 16, 1924. Serial No. 686,587.

This invention relates to the manufacture of tire casings and particularly to the preparation of beads for incorporation in the casings.

In the manufacture of tire casings, it is quite a universal expedient to cover the beads with a strip or strips of fabric which extend outwardly of the beads and a short distance between the plies to form what is known in the practical art as the "flipper strip". In certain types of tire construction, it is the practice to enclose the bead with a single or double strip of fabric which is placed around the base or inner circumference of the bead and brought up to the point of the bead and then extended upwardly a slight distance, the rubber coating on the fabric causing it to adhere to the bead.

The present invention has for its object the provision of a machine to perform this work. So far as known to me, it is the first machine of its kind operating upon the principles set forth herein, and the claims appended hereto are, therefore, entitled to a broad range of equivalents.

In the drawings and description forming a part of this application, there is described one form of the invention, it being understood that changes and modifications may be made in the form of the invention without departure therefrom.

In the drawings:

Figure 1 is a side elevation of the machine;

Figure 2 is a front elevation;

Figure 3 is an enlarged view of the forming mechanism in the act of shaping the fabric about the bead;

Figure 4 is a side view of the bead carrier;

Figure 5 is a section on the line 5—5 of Figure 4;

Figure 6 is a section on the line 6—6 of Figure 3;

Figure 7 is a section on the line 7—7 of Figure 3;

Figure 8 is an enlarged section of the bead on the carrier;

Figures 9 and 10 are detailed views of the bead shaping instrumentalities;

Figure 11 is a section on line 11—11 of Figure 1.

Briefly set forth, my invention comprises a bead carrier or expansible chuck on which the bead is carried during the shaping operation. The fabric for covering the bead is first led from any suitable source and wound over the carrier which is rotated slowly for this purpose. The bead is placed in a ring and the ring and carrier brought together. The carrier is then expanded to bring it into contact with the inner surface of the bead and the placing ring withdrawn, leaving the circular bead over the central portion of the fabric, the skirts or edges of which stand outwardly from the bead. The carrier is now rotated at high speed and two oppositely positioned disks, similar to spinning wheels used on tire making machines, are brought against the bead and gradually fed outwardly to apply the fabric to the bead. As the two disks pass off the outer edge of the bead, the overlapping edges of the fabric are stuck together to form the web or "flipper strip" on the bead.

The machine is carried upon a base 1 from which rises a framework 2 carrying the driving mechanism and on which is mounted a vertical standard 3. On the base is secured a motor 4, the pinion 5 of which drives a large gear 6 secured to a main drive shaft 7 mounted upon the framework. The shaft is designed to operate the rotatable clutch or bead carrier through high and low speed drives by a high speed clutch 8 and a low speed clutch 9 respectively. The shaft is operatively connected with one or the other of said clutches, a shiftable clutch operating member 10 which is mounted on the shaft by a lever 11 pivoted to the base as at 12. To move the lever 11 to operate the slow speed clutch 9, a link 13 is provided which is connected to an arm 14 formed with a foot treadle 15. To move the lever to engage the high speed clutch, an arm 16 is fastened to the lever which rides over an extension 17 connected to the high speed treadle 18. The lever 16 is extended forwardly and received over a vertical pin 19 on which are located, above and below, springs 20 which tend to hold the clutch lever in neutral position. A brake 21 of any suitable design and applied to the outer surface of either of the clutch members is operated by the brake treadle 22 to stop rotation of the mechanism as desired.

The bead supporting drum or chuck is indicated in general by the numeral 23. It is carried upon the end of a shaft 24 mounted in bearings 25 on the top of the frame. It is driven from the high speed clutch by a sprocket chain 26, and from the low speed clutch through a train of reducing gearing comprising the pinion 27 carried by said clutch, which engages gear 28 on the jack shaft 29, which in turn carries pinion 30 in mesh with the large gear 31 on the shaft 24.

The expansible chuck, which has been referred to as 23, is mounted on the end of the shaft 24 at the front of the machine. It is shown in detail in Figures 4 and 5, and while this form may be preferred, others may be substituted for it, as will be appreciated. The chuck comprises a number of shoes or segments 32, shown as six in number, the outer surfaces of the segments constituting a cylindrical bearing surface for the inner circumference of the bead and being preferably roughened as shown in Figure 3 to afford a better gripping action on the material. The segments are of proper size so that they are free to move in and out with respect to the shaft 24 and thereby increase or diminish the circumference of the carrier.

In order to guide the segments, they are carried upon a plate 33, the hub 34 of which is keyed to the shaft 24. Set screws and guide pins 35 guide the segments in their radial movement. The several segments are moved in unison by a sleeve 36 feathered upon the hub 34 and carrying at its inner end a plurality of pivoted thimbles 37, each of which is connected by a double threaded screw 38 to similar thimbles 39 pivoted to each segment. The sleeve 36 is moved longitudinally along the hub 34 by a hand wheel 40 (Figure 1) which has screw threaded engagement with the threads 41 on the end of the shaft 24. The inner end of the wheel is provided with a flange 42 which is retained in a cavity in the end of the sleeve 36 by sectional plates 43. As the hand wheel 40 is moved in and out along the shaft, the chuck will be expanded or contracted to perform the functions to be described.

The bead is shown at 44 and the fabric at 45. As shown, this may comprise wide and narrow strips which are assembled together in the manner shown, although, of course, this is optional. The fabric is led from any suitable source and is rubberized in the usual manner. It is fed onto the chuck while unexpanded and while rotating at slow speed. When a complete revolution has been made the fabric is cut and spliced. The uncovered bead, which is slightly larger on its inner circumference than the band of fabric on the drum, is first placed within the inside of a bead carrying ring 46. This ring is attached to arms 47 which are pivoted to arms 48 carried by the frame of the machine. The ring normally stands away from the drum so as not to interfere with the machine operator, but when swung around toward the machine, the bead is placed over the chuck. The operator now expands the chuck, stretching the fabric slightly and causing it to adhere to the inner surface of the bead. The ring is now swung away and the bead rests upon the outer surface of the chuck, the fabric standing out as shown in dotted lines in Figure 8. It is now ready for the fabric applying and smoothing operation.

This operation is performed by means of two spinning or stretching rollers which are placed beneath the fabric and gradually fed outwardly of the bead while the chuck is in fast rotation. For this purpose the standard 3 is formed with a vertical dove-tailed guideway 50 on which is slidably mounted the stitcher carriage 51, a vertical screw 52 passing through the carriage and having a half nut or dog 53 which is slidably mounted in the carriage to be moved into and out of engagement with the screw by means of an eccentric 54 on the end of a shaft 55 which extends along a cross-head 56 carried up the carriage 51. The shaft is provided with an operating handle 57 by which the nut can be moved.

The spinning rollers are designated by the numerals 58 and 59, the former being located in front of the bead and adjustably mounted on the ends of an arm 60. The roller 59 is on the lower end of an arm 61. The two arms 60 and 61 are formed with lateral extensions 62 which overlap and are pivotally mounted upon a pin 63 located in the cross-head 56. The upper ends of the arms 60 and 61 are connected by lever mechanism so as to be capable of simultaneous movement and for slight yielding capacity. For this purpose the arm 60 is pivotally connected to an intermediate point on a hand lever 64, the shorter end of which is pivotally connected to a longitudinally telescoping link 65 which is kept at its extended position but allowed to yield slightly by a coil spring 66. The end of the link 65 is connected to the end of the arm 61. As the lever 64 is pressed downwardly, the two spinning rollers 58 and 59 are forced together against the bead with a yielding pressure which serves to apply the fabric about the bead while the carriage is moved upwardly by the screw 52, which action is maintained in proper relation to the rotation of the chuck as it is driven from the chuck shaft by a bevel gear 67 thereon which meshes with a bevel gear 68 on the lower end of the shaft 52. The carriage is counterbalanced by a weight 69 suspended from a belt 70 which passes over a pulley 71 on top of the standard 3 and is connected to a clevis 72 on the carriage.

In order to insure that the edges or skirts of the fabric are properly stitched and do not become entangled with the rollers, light metal guards may be provided to turn up the fabric just prior to the stitching operation. From the arm 60 depends a plate 73, the lower inner surface of which is provided with a light finger 74, and from the arm 61 depends a plate 75 from which is extended the finger 76. These fingers or guards cooperate in the manner illustrated in Figure 3 and give the fabric a preliminary shaping before the spinning wheels operate.

It will be observed that the circumference of the chuck determines the amount of fabric to be placed around the bead. As the circumference increases outwardly of the bead, the fabric must be stretched radially, for which reason it is "on the bias" or arranged with its threads at an angle to the edges of the fabric. This operation is one requiring considerable force and so far as known to me, this is the first machine for doing this work, operating upon the spinning principle.

What is claimed is:

1. In an apparatus of the character described, the combination of an expansible chuck adapted to receive a ring of covering fabric, a bead carrier movable to place a bead over the chuck in position to have the fabric applied to its inner surface by expansion of the chuck, shaping mechanisms on opposite sides of the bead, and means to move said mechanisms radially outward to stretch and apply the fabric progressively outward of the bead.

2. In an apparatus of the character described, the combination of an expansible chuck adapted to receive a ring of covering fabric therearound while in contracted position, a bead carrier movable toward and from the chuck and adapted to place a bead around the chuck, means to expand the chuck, fabric shaping rollers located on either side of the bead, and means to move the rollers in unison outwardly of the chuck to apply the fabric about the bead.

3. In an apparatus for the uses and purposes set forth, a drum adapted to receive a ring of covering fabric, means to place an endless bead over the drum and in contact with the fabric, means to rotate the drum, and shaping devices to turn the edges of the fabric outwardly and apply them to the sides of the bead.

4. In an apparatus for the uses and purposes set forth, a drum adapted to receive a ring of covering fabric, means to place a bead over the drum and in contact with the fabric, means to rotate the drum, and shaping devices to turn the edges of the fabric outwardly and apply them to the sides of the bead and to each other beyond the bead.

5. An apparatus for the uses and purposes set forth, a rotary drum adapted to carry a ring of covering fabric with a bead superposed thereon, and shaping devices adapted to operate progressively radially outward of the bead to stretch and apply the edges of the fabric to the sides of the bead.

6. An apparatus for the uses and purposes set forth, a rotary drum adapted to carry a ring of covering fabric with a bead superposed thereon, a carriage movable radially outward of the drum during rotation of the drum, and shaping devices supported upon said carriage.

7. An apparatus for the uses and purposes set forth, a rotary drum adapted to carry on its outer circumference a ring of covering fabric with a bead superposed thereon, a carriage, means to move the carriage operated in unison with the rotation of the drum, and shaping devices supported upon said carriage at opposite sides of the bead.

8. In an apparatus for covering tire beads, means to apply a strip of fabric to the inner surface of the bead, and means acting in a spiral path outwardly of the bead, upon the unapplied edges of the fabric to shape them to the sides of the bead.

9. In an apparatus for covering tire beads, means to apply a strip of fabric to the inner surface of the bead, means to rotate the bead, and a spinning roller movable progressively outwardly of the bead to shape the fabric to the sides of the bead.

10. In a machine for applying fabric to tire beads, a shaft, means to rotate the shaft at high and low speeds, a drum upon said shaft adapted to support a bead, a carriage movable radially of the drum, pivoted arms on said carriage, oppositely positioned spinning rollers on the ends of said arms, means to yieldingly press said spinning rollers against the sides of the bead, and connections between the shaft and the carriage whereby the latter may be moved outwardly of the drum while in rapid rotation.

11. In a machine for applying fabric to tire beads, a shaft, means to rotate the shaft at two speeds, a bead drum upon said shaft adapted to support a bead, a carriage movable radially of the drum, pivoted arms on the carriage, oppositely positioned spinning rollers on the ends of the arms, means to yieldingly force said spinning rollers against the sides of the bead, and connections between the shaft and the carriage whereby the latter may be moved outwardly of the drum while in rapid rotation.

12. In a machine for applying fabric to tire beads, a shaft, means to rotate the shaft, a bead drum upon the shaft adapted to support a bead, a carriage movable radially of the drum, pivoted arms on the carriage, oppositely positioned spinning rollers on the arms, means to force said spinning rollers toward one another and against the sides of the bead, and connections between the shaft and the carriage whereby the latter may be moved outwardly of the drum while in rotation.

13. In a machine for applying fabric to tire beads, a shaft, means to rotate the shaft, a segmental drum upon the shaft adapted to carry a bead upon its outer periphery, means for moving the segments radially of the drum, a carriage, oppositely positioned spinning rollers on said carriage, means to force said spinning rollers toward one another and against the sides of the bead, and feeding means to move the carriage radially outward of the drum while the latter is rotated.

14. In a machine for applying fabric to tire beads, a shaft, means to rotate the shaft at high and low speeds, a segmental drum upon the shaft adapted to support a bead, a carriage, means for moving the carriage radially outward of the drum during high speed, arms on the carriage movable toward and from one another, and spinning rollers on the arms.

15. In a machine for applying fabric to tire beads, a shaft, means to rotate the shaft at high and low speeds, a segmental drum upon the shaft adapted to support a bead, means for expanding or contracting the drum, means for placing a circular bead upon the drum, a carriage, and means on the carriage for shaping and applying the fabric to the bead.

16. In a machine for applying fabric to tire beads, a shaft, a segmental drum upon the shaft, means for expanding or contracting the drum, and means for placing a bead around the drum and out of contact therewith while in contracted condition.

17. In a machine for applying fabric to tire beads, a shaft, a segmental drum upon the shaft, means for expanding or contracting the drum, means for placing a bead around the drum and out of contact therewith while in contracted condition, and means for shaping the fabric to the sides of the bead.

18. Apparatus for making tire beads, comprising a drum for receiving a fabric band and a bead core disposed on the band intermediate its edges, means for folding the band upwardly about the sides of the core, and means for stitching the band over the core and for stitching its marginal portions together to form a flipper on the bead.

WILLIAM C. STEVENS.